(12) United States Patent
Prince

(10) Patent No.: US 8,517,219 B1
(45) Date of Patent: Aug. 27, 2013

(54) MEASURING DEVICE AND METHOD TO USE IT

(76) Inventor: Frenchette Chatman Prince, Saint Louis, MO (US)

( * ) Notice: Subject to any disclaimer, the term of this patent is extended or adjusted under 35 U.S.C. 154(b) by 579 days.

(21) Appl. No.: 12/824,260

(22) Filed: Jun. 28, 2010

Related U.S. Application Data

(60) Provisional application No. 61/228,022, filed on Jul. 23, 2009.

(51) Int. Cl.
*B67D 7/74* (2010.01)
*B67D 7/56* (2010.01)

(52) U.S. Cl.
USPC ............. 222/129; 222/158; 222/454; 141/24; 141/22

(58) Field of Classification Search
USPC ................. 222/149, 157, 158, 159, 206, 209, 222/213, 150, 151, 630, 631, 632, 633; 73/864.01; 141/24
See application file for complete search history.

(56) References Cited

U.S. PATENT DOCUMENTS

| | | | | |
|---|---|---|---|---|
| 941,489 A * | 11/1909 | Beverly | ............................ | 141/24 |
| 2,311,367 A * | 2/1943 | Chambers | ...................... | 401/119 |
| 2,728,232 A * | 12/1955 | Bremmer | ..................... | 73/864.15 |
| 3,115,783 A * | 12/1963 | Martin | ........................ | 73/864.01 |
| 3,146,806 A * | 9/1964 | Ginsburg | ....................... | 141/110 |
| 3,931,741 A | 1/1976 | Ceccarelli | | |
| 4,192,360 A | 3/1980 | Rodriquez | | |
| 4,335,609 A | 6/1982 | Saulsbury | | |
| 4,488,432 A | 12/1984 | Bang | | |
| 4,763,816 A | 8/1988 | Lee | | |
| 4,834,251 A | 5/1989 | Yu | | |
| 5,029,736 A | 7/1991 | Maruyama | | |
| 5,165,558 A | 11/1992 | Cargile | | |
| 5,226,572 A * | 7/1993 | Gargione | ....................... | 222/214 |
| 5,377,879 A | 1/1995 | Isaacs | | |
| 5,464,048 A * | 11/1995 | Allen | ............................... | 141/24 |
| 5,775,546 A * | 7/1998 | Buehler | ......................... | 222/209 |
| 6,263,732 B1 | 7/2001 | Hoeting | | |
| 6,848,484 B1 | 2/2005 | Darr | | |
| 7,007,562 B2 * | 3/2006 | Judic | ............................ | 73/864.01 |
| 7,032,632 B2 | 4/2006 | Shingle | | |
| 7,306,120 B2 | 12/2007 | Hughes | | |
| 2001/0042572 A1* | 11/2001 | Faughey et al. | .................. | 141/24 |
| 2005/0118069 A1* | 6/2005 | Solotareff et al. | ............. | 422/100 |
| 2006/0065326 A1 | 3/2006 | Shingle | | |
| 2007/0113920 A1 | 5/2007 | Bronner | | |
| 2008/0134780 A1 | 6/2008 | Micheli | | |
| 2008/0276705 A1 | 11/2008 | Yeung | | |
| 2009/0133493 A1 | 5/2009 | Roberts | | |

* cited by examiner

*Primary Examiner* — Kevin P Shaver
*Assistant Examiner* — Jeremy W Carroll
(74) *Attorney, Agent, or Firm* — KB Patents; Luca D'Ottone

(57) ABSTRACT

The device of the present invention is a measuring instrument. It is designed to enable the user to draw, and measure precise amounts of liquids such as flavoring extracts, oil, vinegar, syrup, molasses and the like. Its components include a lower base member and a top member joined together by a sealed connection. A dropper or equivalent structure is located in the center of the device and is used to remove the measured quantity of liquid foodstuff from the lower base member of the instant device or from a commercial bottle or container to transfer it into the top member that functions as a measuring cup. The liquid is then dispensed from the top member and mixed with other ingredients as may be required by a recipe.

9 Claims, 3 Drawing Sheets

MEASURING DEVICE AND METHOD TO USE IT

REFERENCE TO RELATED APPLICATIONS

This application claims priority from U.S. Provisional Patent Application No. 61/228,022 to Frenchette C. Prince filed on Jul. 23, 2009, directed to a MEASURING DEVICE that is incorporated by reference.

BACKGROUND OF THE INVENTION

The present invention refers to an improved measuring cup, adapted to separate, measure, and dispense a chosen amount of liquid foodstuff and to constitute a package or container for said liquids including the measuring device.

Measuring cups for foodstuffs are well known to the art. Conventionally, such are available in one cup and two cup sizes, sometimes larger. A typical, conventional measuring cup will be of translucent or preferably transparent material (at least in one vertical side portion of the wall), there being provided measuring indicia (11) as to quantity on one or two portions of the side wall. In the latter case, the indicia are typically 180°-opposed to one another on a cylindrical side wall. One or more grasping handles may be provided and one or more pouring spouts, as well.

Various prior art patents and Published patent applications, such as the ones listed in the Information Disclosure Statement enclosed in this application, address the issue of measuring cups and devices.

For example U.S. Pat. No. 4,192,360 to Rodriquez discloses and claims a measuring device which has a cooperative plastic measuring liquid dropper dispensing a precise volume of liquid directly into an integral plastic spoon bowl. The spoon bowl is integrally foldably hinged to the dispensing tip of the medicine dropper by an integral plastic hinge. An integral plastic snap lock projection disposed on the outer surface of the dropper retains the spoon bowl in a compact storage position in a bottle of liquid.

With reference to the Spoon Dropper disclosed and claimed by the Rodriquez patent, the prior art requires the use of a spoon in any event while the present invention totally eliminates the need for a spoon, hence eliminating the spills that may be associated with using a spoon to dispense liquids. The results produced by the present invention, when compared with the Rodriquez patent, involve less waste and mess, reducing then also the cleaning time.

Recently U.S. Patent Published application 2007/0113920 to Bronner discloses a measuring bottle cap that attaches to the neck of a bottle. Under the teachings of the Bronner application the measuring bottle cap has a seal for sealing the top of the bottle to prevent fluid within the bottle from leaving the bottle, a cylinder that fits over the neck and is fixed to the seal, an annular ring having an inside edge that is fixed to the cylinder and an outside edge that is displaced away from the cylinder, and sides that extend upward from the outside edge of the annular ring. Bonner additionally discloses that sides, annular ring, cylinder, and seal form a cup for holding a liquid. The inside edge of the annular ring may be fixed to the top or the bottom of the cylinder. The sides of the measuring bottle cap may be marked with gradations to indicate the amount of fluid held by the cup. The cup may be sealed with a lid.

On the other hand, the Bronner patent application does not teach a dropper and the cup area is designed to serve as a cap for a container in addition to a measuring cup. The Bronner invention seems to be designed to measure large amounts of liquids while not capable of measuring small and large amounts, such as those required for cooking and baking.

Cooks and housewives are well aware of certain problems with respect to measuring particular types of foodstuffs such as liquids. If an excessive amount of liquid is poured into a measuring cup or measuring spoon, it is not always practical to recycle the excess by returning it to the container. If the measuring cup is used to measure multiple liquids it may become contaminated with traces of the previous liquid, and returning the excess liquid into its original container may not be sanitary or a best practice. There is no risk of such contamination with the device of the present invention as the liquid product has its own container and only one liquid is dispensed from such container.

In addition, most of the prior art devices are complicated to use, require mobile parts and may not be practical to clean, while the device of the present invention is simpler and requires fewer steps to dispense liquid.

Some of the prior art devices, such as the Rodriquez patent are focused on specific drug dispensing applications, while the object of the present invention has been designed to be more versatile and it adapts to more uses: for example, it can be used to dispense cooking and household liquids, in addition to medicines.

While the Rodriquez patent teaches the use of a spoon, this patent is directed to a measuring device interpreted in its broadest sense, so that different sizes of cups, or other containers can be adapted to practice this invention depending on the requirements of the user.

Finally, still with respect to the prior art, spoon droppers are less sanitary since they need to be handled and unfolded prior to dispensing the medicine while there is no handling of inside components of the present invention, except when washing is required.

Recognizing the problem of measuring the proper amount of an ingredient is not sufficiently addressed by the prior art devices, containers, and the like. It is the solution of the problem of adequate measuring and dispensing, together with the solution of the problem of handling and removing the type of liquid foodstuffs in question which is the subject of this invention.

OBJECTS OF THE INVENTION

The first object of the invention is to provide improvements in measuring cups and measuring spoons which are combined with measuring and dispensing devices.

Another object of the invention is to provide improvements in devices for receiving, measuring, and dispensing liquid foodstuffs within a measuring cup or measuring spoon, minimizing waste and contamination.

Another object of the invention is to provide simple, relatively inexpensive and effectively and efficiently operable means associated with a measuring container or cup which will receive liquid foodstuffs, measure same and, further, readily effect and permit removal and dispensing of the foodstuffs from the measuring container without mess or loss.

Another object of the invention is to provide improved measuring cup and measuring spoon constructions having associated therewith devices for receiving, measuring, and handling liquid foodstuffs, such as a measuring cup and a dropper.

Other and further objects of the invention will appear in the course of the following description thereof.

THE DRAWINGS

The drawings form a part of the instant specification and are to be read in conjunction therewith. Embodiments of the invention are shown and, in the various views, like numerals are employed to indicate like parts.

DETAILED DESCRIPTION OF THE DRAWINGS

Figure 1:
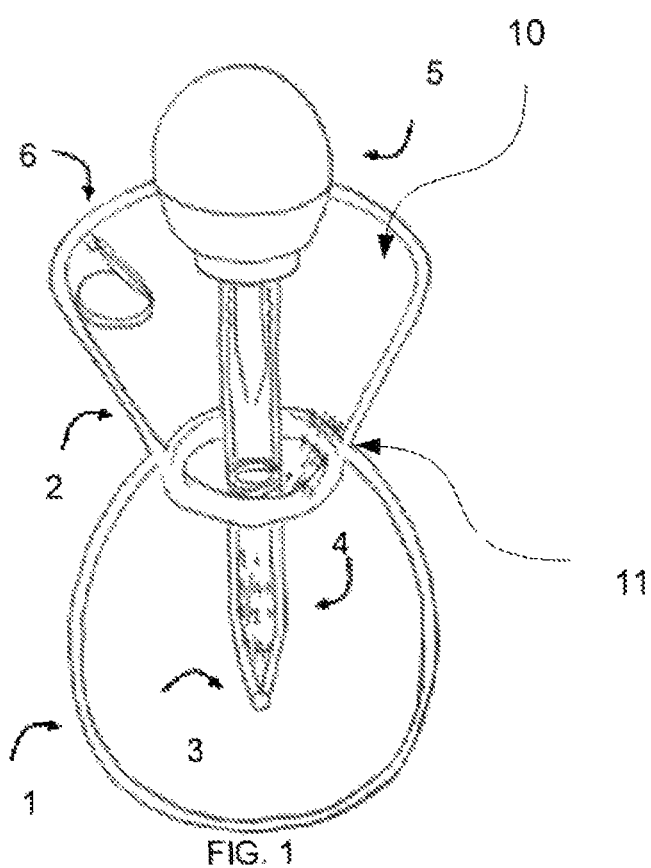
FIG. 1 is a front perspective view of one of the preferred embodiments of the novel and improved measuring cup of the present invention.
Figure 2:
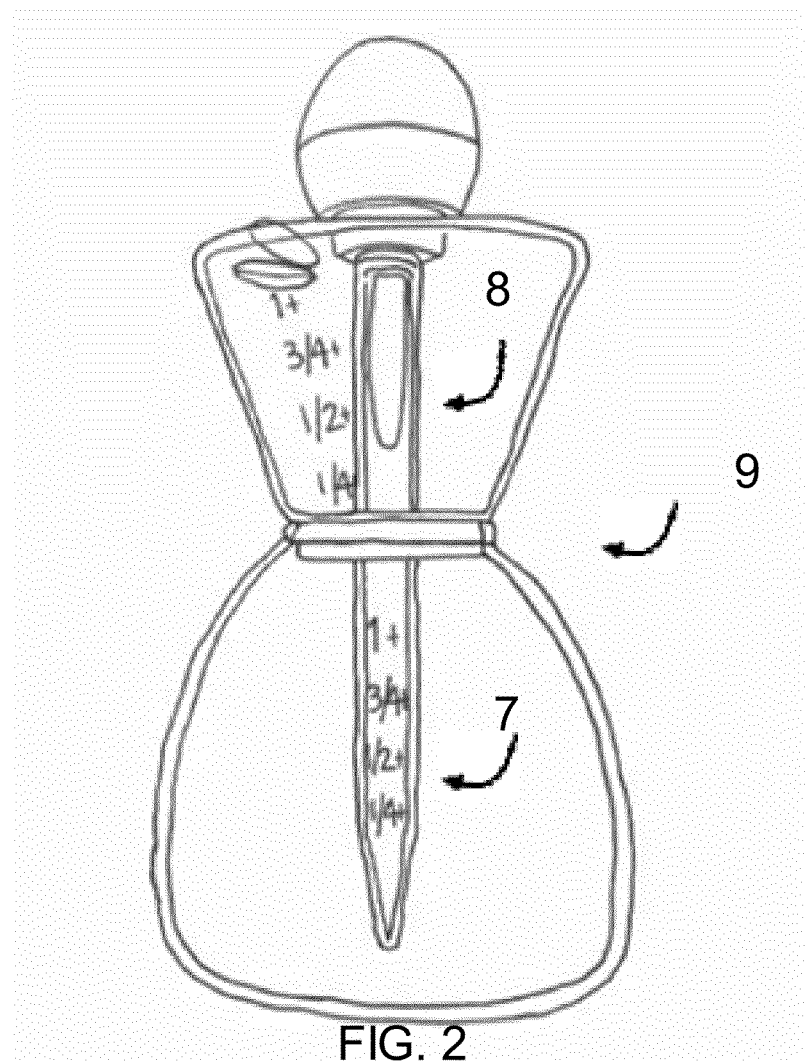
FIG. 2 is a front view of the preferred embodiment of the device of the present invention shown in FIG. 1.
Figure 3:
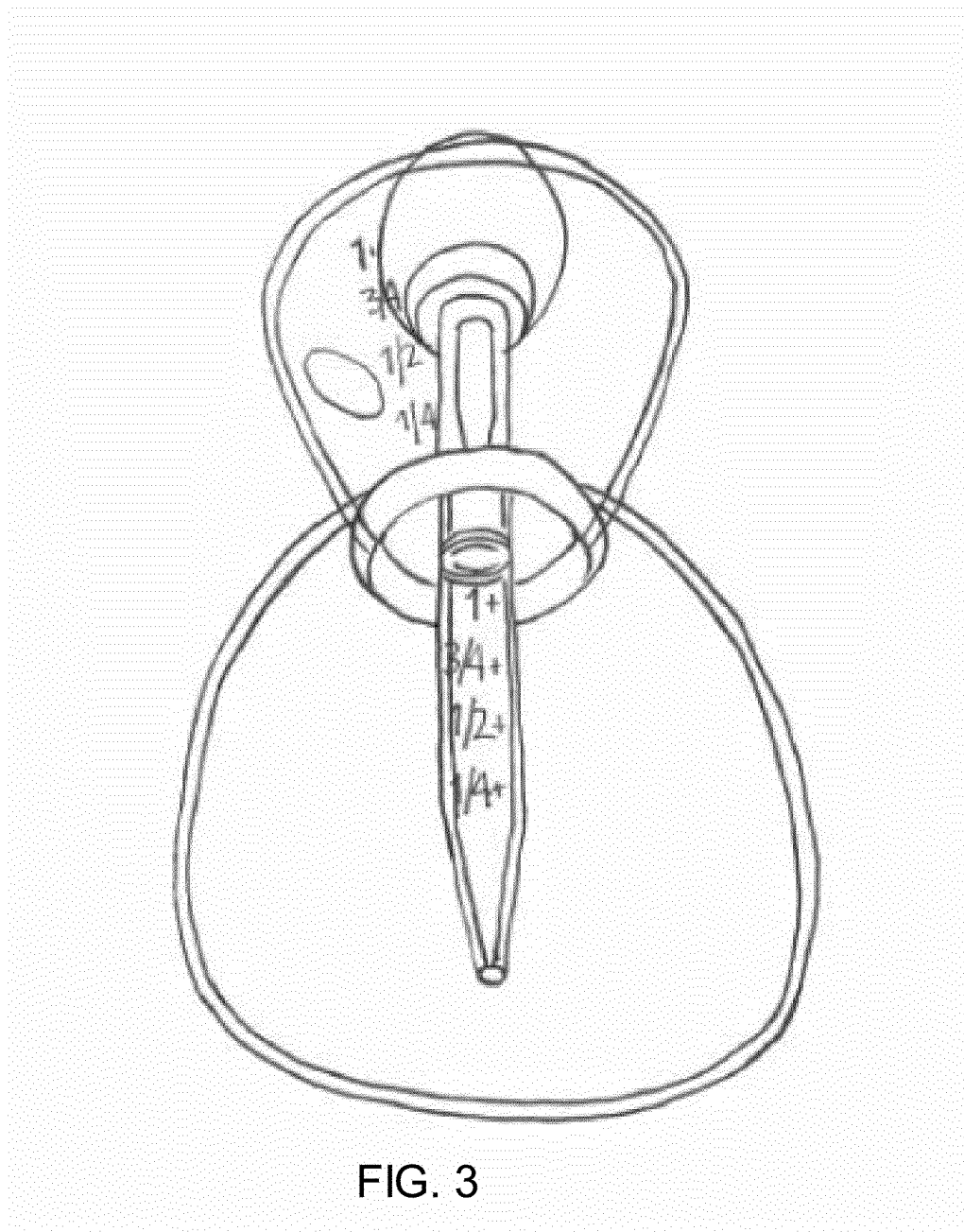
FIG. 3 is a front bottom perspective view of the preferred embodiment of the device of the present invention shown in FIG. 1.

As shown in FIGS. 1-3 the present invention comprises at least: a squeezer or bulb (5), an upper or top cup member (2), a liquid nozzle or measuring tubing (4), and a lower or bottom base member (1).

One of the preferred embodiments of the present invention comprises a lower base member (1) and an upper cup member (2), which has an enclosed top (10). In other embodiments said lower base member can be a bottle, or a container, where the upper members adapts through a sealed connection. Generally speaking, said upper cup member absolves the function of a measuring cup. The upper cup member has an opening (6) on the top to allow for the dispensing of the liquids, once measured.

Both lower and upper members are linked together by a sealed connection (9). The sealed connection separates the lower base member from the top portion of the claimed device, but allows for a measuring tubing or a medicine dropper to fluidly connect the two sections.

The measuring tubing or medicine dropper is activated or controlled by a squeezer or rubber bulb and a tube which serves as a measuring device. In the case of the rubber bulb, when the bulb is compressed, air goes out of it and when it is released, it draws the liquid into the tubing area of the dropper. A mechanical measuring device functions similarly. The measuring dropper remains in place and is not removed. Digital devices may also be used to select and dispense a certain amount of liquid.

Specifically from the drawings, it is also possible to see that the device of the present invention is a measuring and dispensing apparatus comprising a lower base member (1), an upper cup member (2) with functions of containing and delivering, a measuring tubing (4) connecting said lower base member to said upper cup member, said measuring tubing member having at least two openings, respectively placed one (3) in said lower base member, and one (8) in said upper containing and delivering member, a sealed connection (9) between said lower base member and said upper containing member, and a means to draw or suction (5) a measured amount of liquid from said lower base member via said measuring tubing member.

In one of the preferred embodiments of the measuring and dispensing device of the present invention said measuring tubing member must have at least two openings: a lower opening (3) and an upper lateral opening (8). The tubing is connected with said suction means. In a second preferred embodiment of the present invention the combination of said measuring tubing and said suction means is a medicine dropper with at least one lateral opening between the lower opening and the suction means. A third opening, not visible in the drawings may be necessary to connect the bulb to the measuring tubing.

In a separate preferred embodiment of the present invention the combination of said measuring tubing and said suction means is a pipette with at least one lateral opening between the lower opening and the suctioning means.

The instant invention discloses that said suction means is a rubber bulb, a mechanical liquid measuring device, or a digital liquid measuring device. In a separate preferred embodiment of the present invention said measuring tubing has printed indicia (7) in correspondence with calibrated marks to help the user in the determination of how much liquid to draw from said lower base member into said measuring tubing.

The instant invention discloses that said upper cup member having containing and delivering functions is an enclosed container. On the other hand, the base member can either be a separate container assembled as a kit with the other components of the invention or just a commercial liquid container in which case a special sealed connection is needed to adapt to the various standardized sizes of the opening of the commercial liquid container.

Generally speaking, the operations of the device of the present invention can be summarized by the following steps: measuring tubing with its lower opening inside the lower portion of the lower base member, drawing a measured amount of liquid into the tube area via said suctioning means, verifying that the proper amount of liquid is drawn on said printed indicia on the sides of said measuring tubing into the upper cup area, turning the bottle upside down, letting the liquid flow out of said upper lateral opening of said measuring tubing, placing the bottle back into an upright position, and pouring the liquid out into the desired area.

In more detail, the operations of the device of the present invention consist essentially of four basic steps. Said dropper mechanism is positioned with its lower opening inside the lower portion of the device or a regular bottle or container. In the first step, the user squeezes the dropper bulb then releases it. In doing so, a measured amount of liquid is drawn out into the tube area at the proper measurement the user intends.

The second step involves turning the bottle upside down so the liquid goes to the top area of the tube and flows into the upper area of the bottle. The flowing from the tube to the upper area of the measuring cup is facilitated by openings on either side of the tubing at the top near the bulb for the transfer of liquid from the bottom of the apparatus into the measuring cup at the top when turned upside down. Said upper portion of the disclosed measuring cup is similar to a measuring cup as seen with medicines or cooking.

The third step provides for the user to place the bottle back into an upright position. The fourth and final step allows for opening the lid and pouring the liquid out into the desired area. The upper cup area has a flip lid for easier pouring.

The device of the present invention provides a fast and efficient means of measuring and dispensing liquid ingredients which need to be measured in a precise way. It also provides an efficient means of minimizing waste and contamination of liquids, in addition to reducing cooking time.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

I claim:

1. A measuring and dispensing apparatus comprising a lower base member, linked by a sealed connection to an upper cup member which has an enclosed top with one opening to allow for the dispensing of the liquids once measured, and is provided with measuring indicia; a tubing passing through the sealed connection from said lower base member to said upper cup member; said tubing having at least two openings, respectively located one in the lower base member, and one in the upper cup member, and a squeezer positioned in the opening of the tubing placed in the upper cup member; said tubing further comprising a calibrated set of printed indicia designed to measure the volume of fluid to be transferred from said lower base member into the very same tubing.

2. The measuring and dispensing apparatus of claim 1 further comprising at least one lateral opening between the lower opening and the squeezer.

3. The measuring and dispensing apparatus of claim 1 where the said tubing is a liquid nozzle.

4. The measuring and dispensing apparatus of claim 1 where the combination of said measuring tubing and said squeezer is a medicine dropper.

5. The measuring and dispensing apparatus of claim 4 further comprising at least one lateral opening between the lower opening and the squeezer.

6. The measuring and dispensing apparatus of claim 1 further where said squeezer is a rubber bulb.

7. The measuring and dispensing apparatus of claim 6 further comprising at least one lateral opening between the lower opening and the rubber bulb.

8. The measuring and dispensing apparatus of claim 1 where the combination of said measuring tubing and said squeezer is a pipette.

9. The measuring and dispensing apparatus of claim 8 further comprising at least one lateral opening between the lower opening and the pipette.

\* \* \* \* \*